US011570691B2

(12) United States Patent
Won et al.

(10) Patent No.: US 11,570,691 B2
(45) Date of Patent: Jan. 31, 2023

(54) METHOD AND APPARATUS TO CONTROL ACCESS ATTEMPTS FROM A TERMINAL FOR WIRELESS BACKHAUL

(71) Applicant: Nokia Technologies Oy, Espoo (FI)

(72) Inventors: Sung Hwan Won, Flower Mound, TX (US); Betsy Covell, Chicago, IL (US); Malgorzata Tomala, Wroclaw (PL); Dawid Koziol, Wroclaw (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 76 days.

(21) Appl. No.: 17/314,595

(22) Filed: May 7, 2021

(65) Prior Publication Data

US 2021/0352570 A1  Nov. 11, 2021

Related U.S. Application Data

(60) Provisional application No. 63/022,176, filed on May 8, 2020.

(51) Int. Cl.
*H04W 48/02* (2009.01)
*H04W 48/16* (2009.01)

(52) U.S. Cl.
CPC ............ *H04W 48/02* (2013.01); *H04W 48/16* (2013.01)

(58) Field of Classification Search
None
See application file for complete search history.

(56) References Cited

U.S. PATENT DOCUMENTS

| 10,694,447 | B2 * | 6/2020 | Kim | ........................ H04L 67/10 |
| 11,044,776 | B2 * | 6/2021 | Kim | ........................ H04W 76/25 |
| 11,337,141 | B2 * | 5/2022 | Sharma | ................. H04W 76/10 |

OTHER PUBLICATIONS

Qualcomm, "Revised WID: Integrated Access and Backhaul for NR", 3GPP TSG RAN Meeting #84, RP-191538, (Jun. 3-6, 2019), 7 pages.
"3rd Generation Partnership Project; Technical Specification Group Radio Access Network; NR; Study on Integrated Access and Backhaul; (Release 16)", 3GPP TR 38.874 V16.0.0, (Dec. 2018), 111 pages.
"3rd Generation Partnership Project; Technical Specification Group Services and System Aspects; Service requirements for the 5G system; Stage 1 (Release 17)", 3GPP TS 22.261 v17.2.0, (Mar. 2020), 83 pages.
ETSI MCC, "Report of 3GPP TSG RAN2#109-e meeting", 3GPP TSG-RAN WG2 meeting #109bis-e, R2-2002501, (Feb. 24-Mar. 6, 2020), 370 pages.

(Continued)

*Primary Examiner* — Hong S Cho
(74) *Attorney, Agent, or Firm* — Alston & Bird LLP (57) ABSTRACT

A method, apparatus, and computer program product provide for controlling access attempts for wireless backhaul. In the context of a method, the method constructs an access request comprising an Integrated Access and Backhaul (IAB) access indication. The method further determines whether the access attempt is allowed for a particular cell, and if so, determines an establishment cause value based at least on the IAB access indication. The method also causes transmission of the access request and establishment cause value.

20 Claims, 5 Drawing Sheets

(56) References Cited

OTHER PUBLICATIONS

"3rd Generation Partnership Project; Technical Specification Group Core Network and Terminals; Non-Access-Stratum (NAS) protocol for 5G System (5GS); Stage 3; (Release 16)", 3GPP TS 24.501 V16.4.1, (Mar. 2020), 666 pages.

"3rd Generation Partnership Project; Technical Specification Group Radio Access Network; NR; Radio Resource Control (RRC) protocol specification (Release 16)", 3GPP TS 38.331 v16.0.0, (Mar. 2020), 835 pages.

* cited by examiner

METHOD AND APPARATUS TO CONTROL ACCESS ATTEMPTS FROM A TERMINAL FOR WIRELESS BACKHAUL

CROSS REFERENCE TO RELATED APPLICATIONS

This application claims priority to U.S. Provisional Patent Application Ser. No. 63/022,176, filed on May 8, 2020, the contents of which are hereby incorporated by reference in their entirety.

TECHNOLOGICAL FIELD

An example embodiment relates generally to techniques for accessing a mobile core network, and, more particularly, to techniques for providing efficient access control within mobile networks.

BACKGROUND

The $3^{rd}$ Generation Partnership Project (3GPP) is a standards organization which develops protocols for mobile telephony and is known for the development and maintenance of various standards including Long Term Evolution (LTE) and Fifth Generation (5G) standards, among others. 3GPP objectives include the study of Integrated Access and Backhaul (IAB) for New Radio (NR).

Benefits of IAB for NR may include enabling flexible and very dense deployment of NR cells without densifying the transport network proportionately. A diverse range of deployment scenarios can be envisioned including support for outdoor small cell deployments, indoors, or even mobile relays (e.g., on buses, trains, and/or the like).

BRIEF SUMMARY

In an embodiment, an apparatus is provided comprising at least one processor and at least one memory including computer program code with the at least one memory and the computer program code configured to, with the at least one processor, cause the apparatus to, based on a determination that an access attempt associated with Integrated Access and Backhaul (IAB) access is to be performed, construct an access request comprising an IAB access indication. The at least one memory and the computer program code are further configured to, with the at least one processor, cause the apparatus to determine, based at least on the IAB access indication, whether the access attempt is allowed for a particular cell. The at least one memory and the computer program code are further configured to, with the at least one processor, cause the apparatus to, in an instance in which it is determined that the access attempt is allowed for the particular cell, determine an establishment cause value based at least on the IAB access indication. The at least one memory and the computer program code are further configured to, with the at least one processor, cause the apparatus to cause transmission of the access request and establishment cause value.

In some embodiments of the apparatus, the access indication comprises an access category associated with IAB. In some embodiments of the apparatus, the access indication comprises an access identity associated with IAB. In some embodiments of the apparatus, the access request is constructed via a Non-Access Stratum (NAS) layer. In some embodiments of the apparatus, the determination of whether the access attempt is allowed for the particular cell is made via an access stratum (AS) layer. In some embodiments of the apparatus, the access category is assigned to the access request based on an indication associated with cell IAB allowability received from a Radio Resource Control (RRC) layer.

In another embodiment, an apparatus is provided comprising means for, based on a determination that an access attempt associated with Integrated Access and Backhaul (IAB) access is to be performed, constructing an access request comprising an IAB access indication. The apparatus further comprises means for determining, based at least on the IAB access indication, whether the access attempt is allowed for a particular cell. The apparatus further comprises means for, in an instance in which it is determined that the access attempt is allowed for the particular cell, determining an establishment cause value based at least on the IAB access indication. The apparatus further comprises means for causing transmission of the access request and establishment cause value.

In some embodiments of the apparatus, the access indication comprises an access category associated with IAB. In some embodiments of the apparatus, the access indication comprises an access identity associated with IAB. In some embodiments of the apparatus, the access request is constructed via a Non-Access Stratum (NAS) layer. In some embodiments of the apparatus, the determination of whether the access attempt is allowed for the particular cell is made via an access stratum (AS) layer. In some embodiments of the apparatus, the access category is assigned to the access request based on an indication associated with cell IAB allowability received from a Radio Resource Control (RRC) layer.

In another embodiment, a method is provided comprising, based on a determination that an access attempt associated with Integrated Access and Backhaul (IAB) access is to be performed, constructing an access request comprising an IAB access indication. The method further comprises determining, based at least on the IAB access indication, whether the access attempt is allowed for a particular cell. The method further comprises, in an instance in which it is determined that the access attempt is allowed for the particular cell, determining an establishment cause value based at least on the IAB access indication. The method further comprises causing transmission of the access request and establishment cause value.

In some embodiments of the method, the access indication comprises an access category associated with TAB. In some embodiments of the method, the access indication comprises an access identity associated with TAB. In some embodiments of the method, the access request is constructed via a Non-Access Stratum (NAS) layer. In some embodiments of the method, the determination of whether the access attempt is allowed for the particular cell is made via an access stratum (AS) layer. In some embodiments of the method, the access category is assigned to the access request based on an indication associated with cell TAB allowability received from a Radio Resource Control (RRC) layer.

In another embodiment, a computer program product is provided comprising a non-transitory computer readable storage medium having program code portions stored thereon with the program code portions configured, upon execution, to, based on a determination that an access attempt associated with Integrated Access and Backhaul (IAB) access is to be performed, construct an access request comprising an TAB access indication. The program code portions are further configured, upon execution, to determine, based at least on the IAB access indication, whether the access attempt is allowed for a particular cell. The program code portions are further configured, upon execution, to, in an instance in which it is determined that the access attempt is allowed for the particular cell, determine an establishment cause value based at least on the TAB access indication. The program code portions are further configured, upon execution, to cause transmission of the access request and establishment cause value.

In some embodiments of the computer program product, the access indication comprises an access category associated with IAB. In some embodiments of the computer program product, the access indication comprises an access identity associated with IAB. In some embodiments of the computer program product, the access request is constructed via a Non-Access Stratum (NAS) layer. In some embodiments of the computer program product, the determination of whether the access attempt is allowed for the particular cell is made via an access stratum (AS) layer. In some embodiments of the computer program product, the access category is assigned to the access request based on an indication associated with cell IAB allowability received from a Radio Resource Control (RRC) layer.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

Some embodiments of the present disclosure will now be described more fully hereinafter with reference to the accompanying drawings, in which some, but not all, embodiments of the disclosure are shown. Indeed, some embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

Overview

As described above, one of the potential technologies targeted to enable future cellular network deployment scenarios and applications is the support for wireless backhaul and relay links, enabling flexible and very dense deployment of NR cells without the need for densifying the wired transport network proportionately.

Figure 1:
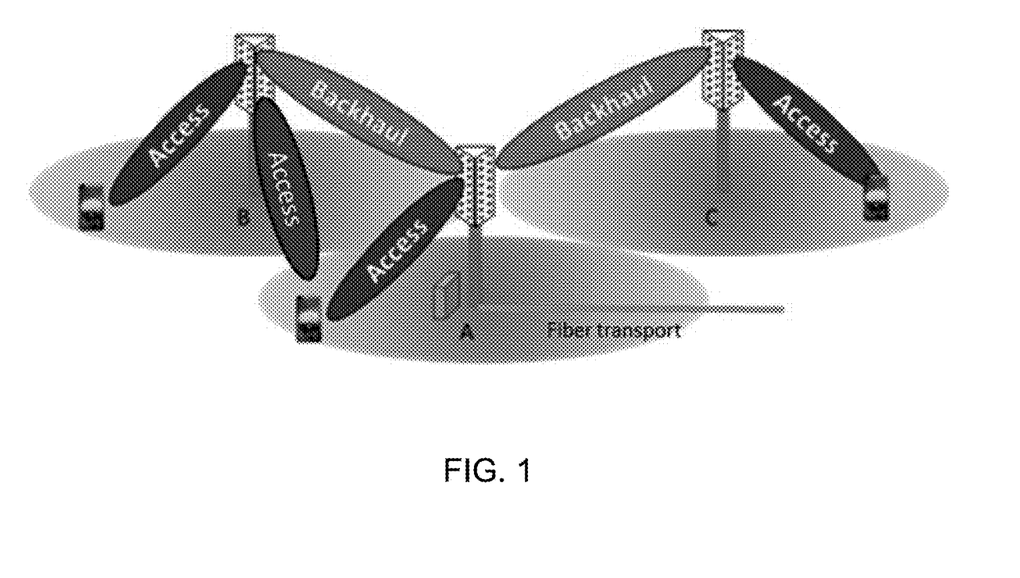
FIG. 1 is a representation of example integrated access and backhaul links in accordance with an example embodiment of the present disclosure.

The expected larger bandwidth available for NR compared to LTE along with the native deployment of massive MIMO or multi-beam systems in NR creates an opportunity to develop and deploy integrated access and backhaul links. This may allow easier deployment of a dense network of self-backhauled NR cells in a more integrated manner than in LTE by building upon many of the NR control and data channels and/or procedures defined for providing access to user equipment (UE). An example illustration of a network with such integrated access and backhaul links is shown in FIG. 1, where relay nodes (IAB-nodes) A, B, and C can multiplex access and backhaul links in time, frequency, and/or space (e.g., beam-based operation).

Figure 2:
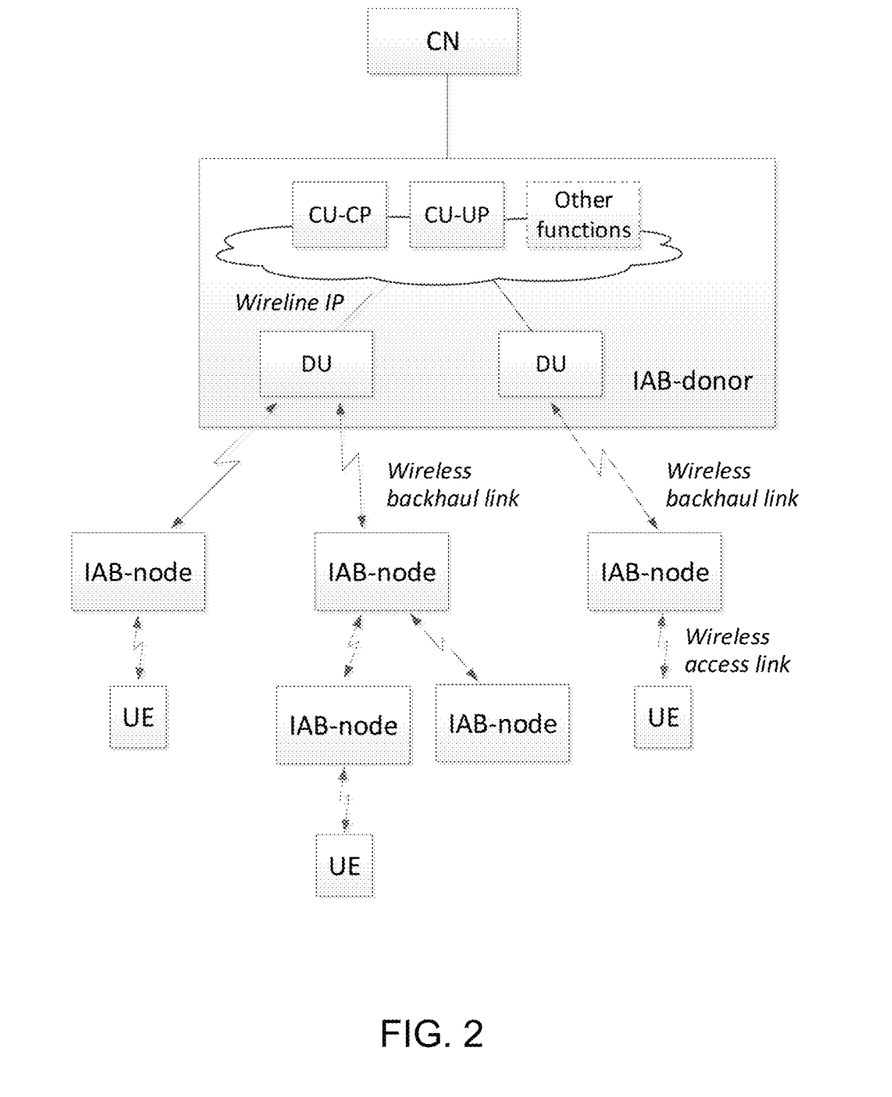
FIG. 2 is a representation of an example IAB architecture in accordance with an example embodiment of the present disclosure.

FIG. 2 illustrates an example reference diagram for an IAB architecture. IAB strives to reuse existing functions and interfaces defined for access, one example being the Mobile-Termination (MT) function. The MT function has been defined as a component of the mobile equipment. In the context of IAB, IAB-MT is a function residing on an IAB-node that terminates the radio interface layers of the backhaul Uu interface towards the IAB-donor or other IAB-nodes.

Consequently, IAB-MT denotes an IAB-node function that terminates the Uu interface to the parent node reusing the procedures and behaviors specified for regular UEs whenever possible and required. However, to ease deployments and IAB implementation, IAB nodes will have a small set of mandatory features. In other words, IAB-MT does not need to support all mandatory 3GPP Release 15 (Rel-15) UE features. While one of the key 5G requirements for any NR terminal is support of Unified Access Control (UAC TS22.261), 3GPP RAN2 agreed it is not mandatory to comply with UAC procedures when accessing the network as an IAB-MT node.

In particular, access attempts of an IAB node to a cell are allowed if the cell allows access of IAB nodes, whereas access attempts of an IAB node to a cell are not allowed if the cell does not allow access of IAB nodes. Additionally, IAB-MT ignores traditional cell barring indications (e.g., cellBarred in MIB, cellReservedForOperatorUse, and cellReservedForOtherUse in SIB1) and the UAC procedure does not apply to IAB nodes.

In this regard, two reasons to avoid UAC applicability to IAB are to minimize IAB node complexity and control IAB-MT access in such a manner to achieve a highest possible success rate. For at least these reasons, IAB-MT should be intentionally excluded from barring, e.g., when an IAB-MT function of an IAB node (following UE procedures for making a connection), whenever the cell indicates it supports IAB connections. However, UAC applicability cannot be completely avoided. Purposes of UAC procedure do not only include performing an access barring check. IAB node access attempts need to get categorization of this access attempt to be able to determine and set a Radio Resource Control (RRC) establishment cause. This realization is presently not accounted for in the 3GPP standard. Said differently, for IAB, if a cell indicates that it supports IAB, any access attempt should be allowed, and no access attempt shall be barred. Normally, Unified Access Control (UAC) handles the (potential) access barring, so it has been agreed upon that the UAC procedure should not apply to IAB. However, UAC does not only handle potential access barring, but also assigns a categorization for each access attempt, the categorization being necessary to determine and set the RRC establishment cause. Thus, simply ignoring UAC for IAB is not possible.

Example Apparatus

Figure 3:
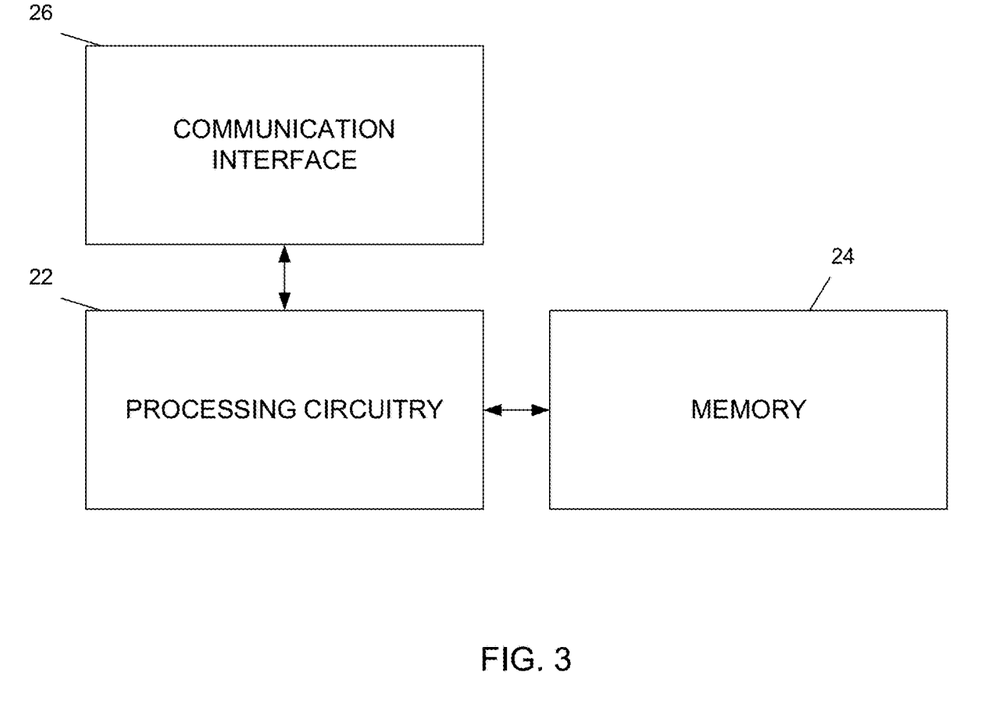
FIG. 3 is a block diagram of an apparatus that may be specifically configured in accordance with an example embodiment of the present disclosure.

One example of an apparatus 300 that may be configured to carry out operations in accordance with an embodiment described herein is depicted in FIG. 3. As shown in FIG. 3, the apparatus includes, is associated with or is in communication with processing circuitry 32, a memory 34 and a communication interface 36. The processing circuitry 32 may be in communication with the memory via a bus for passing information among components of the apparatus. The memory may be non-transitory and may include, for example, one or more volatile and/or non-volatile memories. In other words, for example, the memory may be an electronic storage device (e.g., a computer readable storage medium) comprising gates configured to store data (e.g., bits) that may be retrievable by a machine (e.g., a computing device like the processing circuitry). The memory may be configured to store information, data, content, applications, instructions, or the like for enabling the apparatus to carry out various functions in accordance with an example embodiment of the present disclosure. For example, the memory could be configured to buffer input data for processing by the processing circuitry. Additionally, or alternatively, the memory could be configured to store instructions for execution by the processing circuitry.

The apparatus 100 may, in some embodiments, be embodied in various computing devices. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processing circuitry 32 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally, or alternatively, the processing circuitry may include one or more processors configured in tandem via the bus to enable independent execution of instructions, pipelining and/or multithreading.

In an example embodiment, the processing circuitry 32 may be configured to execute instructions stored in the memory device 34 or otherwise accessible to the processing circuitry. Alternatively, or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ one embodiment by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 36 may be any means such as a device or circuitry embodied in either hardware or a combination of hardware and software that is configured to receive and/or transmit data, including media content in the form of video or image files, one or more audio tracks or the like. In this regard, the communication interface may include, for example, an antenna (or multiple antennas) and supporting hardware and/or software for enabling communications with a wireless communication network. Additionally, or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

According to some embodiments, the apparatus 300 may be configured in accordance with a cellular network architecture. In this regard, the apparatus 300 may be configured as an IAB node. In some embodiments, the apparatus 300 may be embodied by user equipment (UE), such as a cellular phone or the like. While certain embodiments herein refer to operations associated with the 5G NR standard, it is to be appreciated that the processes discussed herein may be utilized for any cellular network standard.

Example IAB for NR Processes

Figure 4:
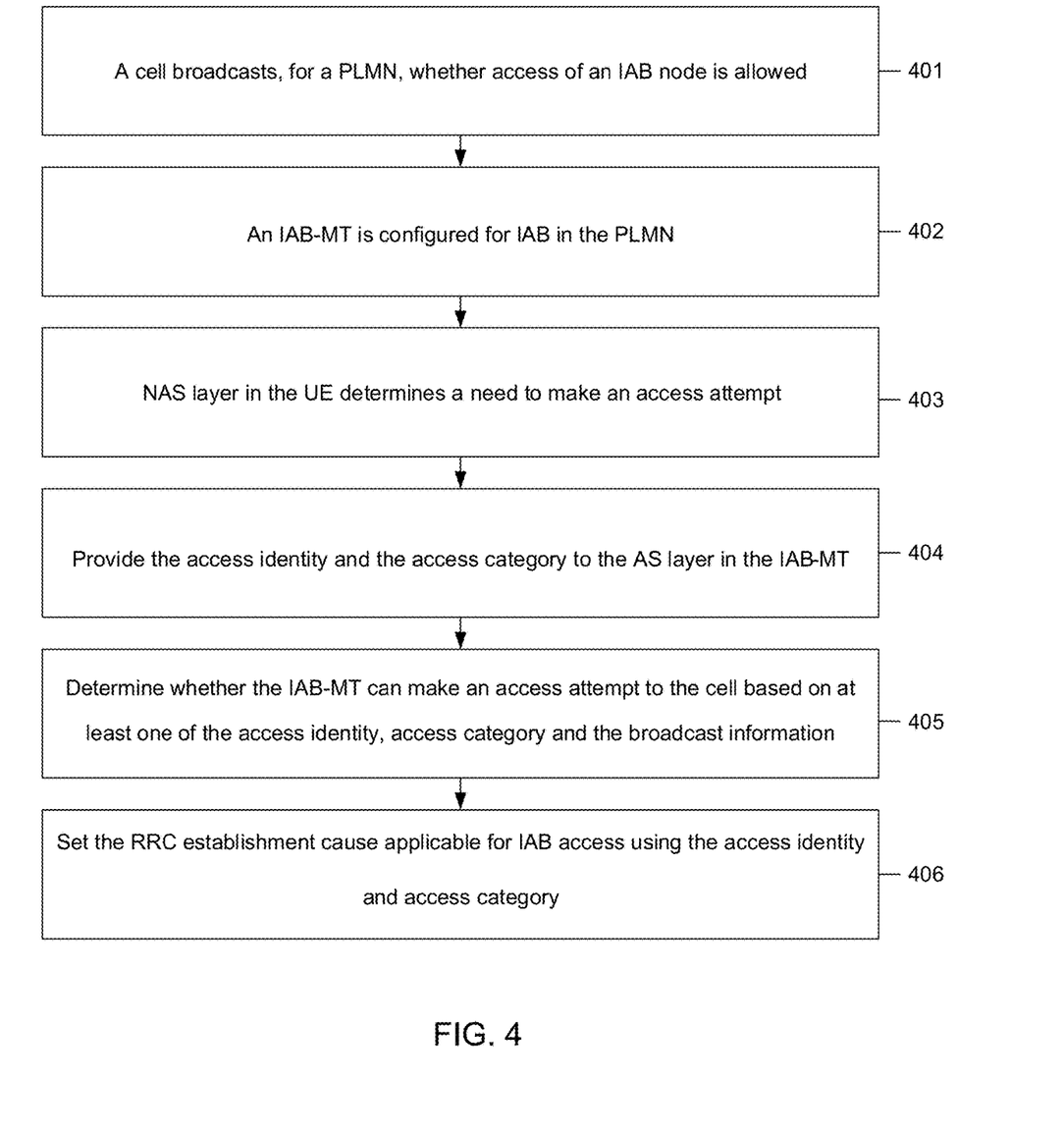
FIG. 4 is a flow diagram illustrating operations performed in accordance with an example embodiment.

FIG. 4 illustrates a flow diagram providing example operations of certain embodiments described herein. At Block 401, a cell may broadcast whether access of an IAB node is allowed for a particular public land mobile network (PLMN). In this regard, an NR cell may signal in Master Information Broadcast (MIB) a cell status and cell reservation indicators. As described above, IAB-MT may ignore the cellBarred, cellReservedForOperatorUse, cellReservedForOtherUse and intraFreqReselection indications. The IAB-MT may treat the fields as if the fields were set to allowed.

At Block 402, an IAB-MT is configured for IAB in the PLMN. A Universal Subscriber Identify Module (USIM) file, e.g., $EF_{UAC\_AIC}$, may indicate that the UE is configured to access identity "X," which is for IAB or that the UE is configured for IAB. The USIM file may only be valid in one or more of the home PLMN, PLMNs equivalent to the home PLMN, any PLMN in the home country, PLMNs configured in the UE (in which the UE is configured with a list of PLMNs), and/or any PLMN.

In some embodiments, the UE may receive an indication from a PLMN that access identity "X," which is for IAB, is valid in the PLMN, or that the UE is configured for IAB. This indication may be sent via the 5GS (Fifth Generation Standard) network feature support, e.g., in the 5G Mobility Management (5GMM) protocol from the Access and Mobility Management Function (AMF) to the UE. Further, the UE may be configured with an indication that the UE is configured for access identity "X" or that the UE is configured for IAB, which may be associated with a list of PLMNs in the Non-Access Stratum (NAS) configuration management object. In this case, access identity "X" is valid or the UE is configured for IAB in the list of PLMNs. In another embodiment, the UE access attempt may be configured as an access category for a UE configured for IAB.

At Block 403, the NAS layer in the UE determines a need to make an access attempt (e.g., registration). In this regard, the NAS layer in the UE may assign an access identity for a UE configured for IAB and an access category for the access attempt.

In an embodiment, in order to enable mapping an access attempt to access identity "X" (for IAB), Table A below illustrates modifications (Access Identity Number "X" and associated UE configuration) to Table 4.5.2.1 of 3GPP Technical Specification (TS) 24.501.

TABLE A

| Access Identity number | UE configuration |
|---|---|
| 0 | UE is not configured with any parameters from this table |
| 1 (NOTE 1) | UE is configured for multimedia priority service (MPS). |
| 2 (NOTE 2) | UE is configured for mission critical service (MCS). |
| X (NOTE 4) | UE is configured for integrated access backhaul (IAB). |
| [X + 1]-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |
| 14 (NOTE 3) | Access Class 14 is configured in the UE. |
| 15 (NOTE 3) | Access Class 15 is configured in the UE. |

NOTE 1:
Access identity 1 is valid when:
the USIM file EFUAC_AIC indicates the UE is configured for access identity 1 and the selected PLMN, if a new PLMN is selected, or RPLMN is the HPLMN (if the EHPLMN list is not present or is empty) or EHPLMN (if the EHPLMN list is present), or a visited PLMN of the home country (see the definition of home country in 3GPP TS 24.301 [15]); or the UE receives the 5GS network feature support IE with the MPS indicator bit set to "Access identity 1 valid" from the RPLMN as described in subclause 5.5.1.2.4 and subclause 5.5.1.3.4.
NOTE 2:
Access identity 2 is used by UEs configured for MCS and is valid when:
the USIM file EFUAC_AIC indicates the UE is configured for access identity 2 and the selected PLMN, if a new PLMN is selected, or RPLMN is the HPLMN (if the EHPLMN list is not present or is empty) or EHPLMN (if the EHPLMN list is present), or a visited PLMN of the home country (see 3GPP TS 23.122 [5]); or
the UE receives the 5GS network feature support IE with the MCS indicator bit set to "Access identity 2 valid" from the RPLMN as described in subclause 5.5.1.2.4 and subclause 5.5.1.3.4.
NOTE 3:
Access identities 11 and 15 are valid in HPLMN (if the EHPLMN list is not present or is empty) or EHPLMN (if the EHPLMN list is present). Access Identities 12, 13 and 14 are valid in HPLMN and visited PLMNs of home country only (see the definition of home country in 3GPP TS 24.301 [15]).
NOTE 4:
Access identity X is used by UEs configured for IAB and is valid when:
the USIM file EFUAC_AIC indicates the UE is configured for access identity X and the selected PLMN, if a new PLMN is selected, or RPLMN is the HPLMN (if the EHPLMN list is not present or is empty) or EHPLMN (if the EHPLMN list is present), or a visited PLMN of the home country (see 3GPP TS 23.122 [5]); or
the UE receives the 5GS network feature support IE with the IAB indicator bit set to "Access identity X valid" from the RPLMN as described in subclause 5.5.1.2.4 and subclause 5.5.1.3.4.
There can be an additional condition to consider the validity: the lower layers have indicated that the current cell supports IAB.

Alternatively, rather than defining a new access category for IAB, a new access identity for IAB may be defined. In this regard, while an access category characterizes a specific access attempt of a UE (e.g., SMS, voice call), an access identity characterizes the UE itself, and IAB is a UE characteristic. However, an access category may be defined for IAB instead of defining an access identity for IAB. In this case, Table 4.5.2.2 of TS 24.501 may be modified as follows in Table B (in which a new access category for IAB is defined), or alternatively, in Table C (in which the existing access category for mobile terminated access, e.g., Access Category 0 is used for access attempts made by a UE configured for IAB). In addition, the RRC layer assigns AS-originated Access Category for IAB-MT access as shown in Table B-1.

TABLE B

| | Access Categories | | |
|---|---|---|---|
| Rule # | Type of access attempt | Requirements be met | Access Category |
| Lower than 1 | Access attempt for IAB | UE is configured for IAB | Y (= IAB) |
| 1 | Response to paging or NOTIFICATION over non-3GPP access; 5GMM connection management procedure initiated | Access attempt is for MT access, or handover of ongoing MMTEL voice call, MMTEL video call or SMSoIP from non-3GPP access | 0 (= MT_acc) |

TABLE B-continued

Access Categories

| Rule # | Type of access attempt | Requirements be met | Access Category |
|---|---|---|---|
| | for the purpose of transporting an LPP message without an ongoing 5GC-MO-LR procedure; Access attempt to handover of ongoing MMTEL voice call, MMTEL video call or SMSoIP from non-3GPP access | | |
| 2 | Emergency | UE is attempting access for an emergency session (NOTE 1, NOTE 2) | 2 (= emergency) |
| 3 | Access attempt for operator-defined access category | UE stores operator-defined access category definitions valid in the current PLMN as specified in subclause 4.5.3, and access attempt is matching criteria of an operator-defined access category definition | 32-63 (= based on operator classification) |
| 3.1 | Access attempt for MO exception data | UE is in NB-N1 mode and allowed to use exception data reporting (see the ExceptionDataReportingAllowed leaf of the NAS configuration MO in 3GPP TS 24.368 [17] or the USIM file $EF_{NASCONFIG}$ in 3GPP TS 31.102 [22]), and access attempt is for MO data or for MO signalling initiated upon receiving a request from upper layers to transmit user data related to an exceptional event | 10 (= MO exception data) |
| 4 | Access attempt for delay tolerant service | (a) UE is configured for NAS signalling low priority or UE supporting S1 mode is configured for EAB (see the "ExtendedAccessBarring" leaf of NAS configuration MO in 3GPP TS 24.368 [17] or 3GPP TS 31.102 [22]) where "EAB override "does not apply, and (b): the UE received one of the categories a, b or c as part of the parameters for unified access control in the broadcast system information, and the UE is a member of the broadcasted category in the selected PLMN or RPLMN/equivalent PLMN (NOTE 3, NOTE 5, NOTE 6, NOTE 7, NOTE 8) | 1 (= delay tolerant) |
| 4.1 | MO IMS registration related signalling | Access attempt is for MO IMS registration related signalling (e.g. IMS initial registration, re-registration, subscription refresh) or for NAS signalling connection recovery during ongoing procedure for MO IMS registration related signalling (NOTE 2a) | 9 (= MO IMS registration related signalling) |
| 5 | MO MMTel voice call | Access attempt is for MO MMTel voice call or for NAS signalling connection recovery during ongoing MO MMTel voice call (NOTE 2) | 4 (= MO MMTel voice) |
| 6 | MO MMTel video call | Access attempt is for MO MMTel video call or for NAS signalling connection recovery during ongoing MO MMTel video call (NOTE 2) | 5 (= MO MMTel video) |
| 7 | MO SMS over NAS or MO SMSoIP | Access attempt is for MO SMS over NAS (NOTE 4) or MO SMS over SMSoIP transfer or for NAS signalling connection recovery during ongoing MO SMS or SMSoIP transfer (NOTE 2) | 6 (= MO SMS and SMSoIP) |

TABLE B-continued

Access Categories

| Rule # | Type of access attempt | Requirements be met | Access Category |
|---|---|---|---|
| 8 | UE NAS initiated 5GMM specific procedures | Access attempt is for MO signaling | 3 (= MO_sig) |
| 8.1 | Mobile originated location request | Access attempt is for mobile originated location request (NOTE 9) | 3 (= MO_sig) |
| 8.2 | Mobile originated signalling transaction towards the PCF | Access attempt is for mobile originated signalling transaction towards the PCF (NOTE 10) | 3 (= MO_sig) |
| 9 | UE NAS initiated 5GMM connection management procedure or 5GMM NAS transport procedure | Access attempt is for MO data | 7 = MO_data) |
| 10 | An uplink user data packet is to be sent for a PDU session with suspended user-plane resources | No further requirement is to be met | 7 (= MO_data) |

NOTE 1:

This includes 5GMM specific procedures while the service is ongoing and 5GMM connection management procedures required to establish a PDU session with request type = "initial emergency request" or "existing emergency PDU session", or to re-establish user-plane resources for such a PDU session. This further includes the service request procedure initiated with a SERVICE REQUEST message with the Service type IE set to "emergency services fallback".

NOTE 2:

Access for the purpose of NAS signalling connection recovery during an ongoing service as defined in subclause 4.5.5, or for the purpose of NAS signalling connection establishment following fallback indication from lower layers during an ongoing service as defined in subclause 4.5.5, is mapped to the access category of the ongoing service in order to derive an RRC establishment cause, but barring checks will be skipped for this access attempt.

NOTE 2a:

Access for the purpose of NAS signalling connection recovery during an ongoing procedure for MO IMS registration related signalling as defined in subclause 4.5.5, or for the purpose of NAS signalling connection establishment following fallback indication from lower layers during an ongoing procedure for MO IMS registration related signalling as defined in subclause 4.5.5, is mapped to the access category of the MO IMS registration related signalling in order to derive an RRC establishment cause, but barring checks will be skipped for this access attempt.

NOTE 3:

If the UE selects a new PLMN, then the selected PLMN is used to check the membership; otherwise the UE uses the RLPMN or a PLMN equivalent to the RPLMN.

NOTE 4:

This includes the 5GMM connection management procedures triggered by the UE-initiated NAS transport procedure for transporting the MO SMS.

NOTE 5:

The UE configured for NAS signalling low priority is not supported in this release of specification. If a UE supporting both S1 mode and N1 mode is configured for NAS signalling low priority in S1 mode as specified in 3GPP TS 24.368 [17] TS 31.102 [22], the UE shall ignore the configuration for NAS signalling low priority when in N1 mode.

NOTE 6:

If the access category applicable for the access attempt is 1, then the UE shall additionally determine a second access category from the range 3 to 7. If more than one access category matches, the access category of the lowest rule number shall be chosen. The UE shall use the second access category only to derive an RRC establishment cause for the access attempt.

NOTE 7:

"EAB override" does not apply, if the UE is not configured to allow overriding EAB (see the "Override_ExtendedAccessBarring" leaf of NAS configuration MO in 3GPP TS 24.368 [17] or 3GPP TS 31.102 [22]), or if NAS has not received an indication from the upper layers to override EAB and the UE does not have a PDU session that was established with EAB override.

NOTE 8:

For the definition of categories a, b and c associated with access category 1, see 3GPP TS 22.261 [3]. The categories associated with access category 1 are distinct from the categories a, b and c associated with EAB (see 3GPP TS 22.011 [1A]).

NOTE 9:

This includes:

a) the UE-initiated NAS transport procedure for transporting a mobile originated location request;

b) the 5GMM connection management procedure triggered by a) above; and c) NAS signalling connection recovery during an ongoing 5GC-MO-LR procedure.

NOTE 10:

This includes:

a) the UE-initiated NAS transport procedure for transporting a mobile originated signalling transaction towards the PCF;

b) the 5GMM connection management procedure triggered by a) above; and c) NAS signalling connection recovery during an ongoing UE triggered V2X policy provisioning procedure.

TABLE B-1

| Access Category number | Conditions related to UE | Type of access attempt |
|---|---|---|
| 0 | All | MO signalling resulting from paging |
| 1 (NOTE 1) | UE is configured for delay tolerant service and subject to access control for Access Category 1, which is judged based on relation of UE's HPLMN and the selected PLMN. | All except for Emergency, or MO exception data |
| 2 | All | Emergency |
| 3 | All except for the conditions in Access Category 1. | MO signalling on NAS level resulting from other than paging |
| 4 | All except for the conditions in Access Category 1. | MMTEL voice (NOTE 3) |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories (NOTE 4) |
| 8 | All except for the conditions in Access Category 1 | MO signalling on RRC level resulting from other than paging |
| 9 | All except for the conditions in Access Category 1 | MO IMS registration related signalling (NOTE 5) |
| 10 (NOTE 6) | All | MO exception data |
| Y | All | All initiating on RRC level for IAB-MT |
| 12-31 | Reserved standardized Access Categories | |
| 32-63 (NOTE 2) | All | Based on operator classification |

TABLE C

| Rule # | Type of access attempt | Requirements to be met | Access Category |
|---|---|---|---|
| 1 | Response to paging or NOTIFICATION over non-3GPP access; 5GMM connection management procedure initiated for the purpose of transporting an LPP message without an ongoing 5GC-MO-LR procedure; Access attempt to handover of ongoing MMTEL voice call, MMTEL video call or SMSoIP from non-3GPP access; Access attempt for IAB | Access attempt is for MT access, or handover of ongoing MMTEL voice call, MMTEL video call or SMSoIP from non-3GPP access Access attempt is for IAB-MT access, or to be more precise, Access attempt is initiated by IAB-MT in a cell indicating iab-Support (e.g., access attempt is initiated by a UE configured for IAB in the current PLMN and the lower layers have indicated that the IAB node is supported) Or all access attempts initiated by IAB-MT can be the requirement | 0 (= MT_acc) |
| 2 | Emergency | UE is attempting access for an emergency session (NOTE 1, NOTE 2) | 2 (= emergency) |
| 3 | Access attempt for operator-defined access category | UE stores operator-defined access category definitions valid in the current PLMN as specified in subclause 4.5.3, and access attempt is matching criteria of an operator-defined access category definition | 32-63 (= based on operator classification) |

TABLE C-continued

| Rule # | Type of access attempt | Requirements to be met | Access Category |
|---|---|---|---|
| 3.1 | Access attempt for MO exception data | UE is in NB-N1 mode and allowed to use exception data reporting (see the ExceptionDataReportingAllowed leaf of the NAS configuration MO in 3GPP TS 24.368 [17] or the USIM file $EF_{NASCONFIG}$ in 3GPP TS 31.102 [22]), and access attempt is for MO data or for MO signalling initiated upon receiving a request from upper layers to transmit user data related to an exceptional event | 10 (= MO exception data) |
| 4 | Access attempt for delay tolerant service | (a) UE is configured for NAS signalling low priority or UE supporting S1 mode is configured for EAB (see the "ExtendedAccessBarring" leaf of NAS configuration MO in 3GPP TS 24.368 [17] or 3GPP TS 31.102 [22]) where "EAB override" does not apply, and (b): the UE received one of the categories a, b or c as part of the parameters for unified access control in the broadcast system information, and the UE is a member of the broadcasted category in the selected PLMN or RPLMN/equivalent PLMN (NOTE 3, NOTE 5, NOTE 6, NOTE 7, NOTE 8) | 1 (= delay tolerant) |
| 4.1 | MO IMS registration related signalling | Access attempt is for MO IMS registration related signalling (e.g. IMS initial registration, re-registration, subscription refresh) or for NAS signalling connection recovery during ongoing procedure for MO IMS registration related signalling (NOTE 2a) | 9 (= MO IMS registration related signalling) |
| 5 | MO MMTel voice call | Access attempt is for MO MMTel voice call or for NAS signalling connection recovery during ongoing MO MMTel voice call (NOTE 2) | 4 (= MO MMTel voice) |
| 6 | MO MMTel video call | Access attempt is for MO MMTel video call or for NAS signalling connection recovery during ongoing MO MMTel video call (NOTE 2) | 5 (= MO MMTel video) |
| 7 | MO SMS over NAS or MO SMSoIP | Access attempt is for MO SMS over NAS (NOTE 4) or MO SMS over SMSoIP transfer or for NAS signalling connection recovery during ongoing MO SMS or SMSoIP transfer (NOTE 2) | 6 (= MO SMS and SMSoIP) |
| 8 | UE NAS initiated 5GMM specific procedures | Access attempt is for MO signalling | 3 (= MO_sig) |
| 8.1 | Mobile originated location request | Access attempt is for mobile originated location request (NOTE 9) | 3 (= MO_sig) |
| 8.2 | Mobile originated signalling transaction towards the PCF | Access attempt is for mobile originated signalling transaction towards the PCF (NOTE 10) | 3 (= MO_sig) |
| 9 | UE NAS initiated 5GMM connection management procedure or 5GMM NAS transport procedure | Access attempt is for MO data | 7 (= MO_data) |

TABLE C-continued

| Rule # | Type of access attempt | Requirements to be met | Access Category |
|---|---|---|---|
| 10 | An uplink user data packet is to be sent for a PDU session with suspended user-plane resources | No further requirement is to be met | 7 (= MO_data) |

NOTE 1:
This includes 5GMM specific procedures while the service is ongoing and 5GMM connection management procedures required to establish a PDU session with request type = "initial emergency request" or "existing emergency PDU session", or to re-establish user-plane resources for such a PDU session. This further includes the service request procedure initiated with a SERVICE REQUEST message with the Service type IE set to "emergency services fallback".
NOTE 2:
Access for the purpose of NAS signalling connection recovery during an ongoing service as defined in subclause 4.5.5, or for the purpose of NAS signalling connection establishment following fallback indication from lower layers during an ongoing service as defined in subclause 4.5.5, is mapped to the access category of the ongoing service in order to derive an RRC establishment cause, but barring checks will be skipped for this access attempt.
NOTE 2a:
Access for the purpose of NAS signalling connection recovery during an ongoing procedure for MO IMS registration related signalling as defined in subclause 4.5.5, or for the purpose of NAS signalling connection establishment following fallback indication from lower layers during an ongoing procedure for MO IMS registration related signalling as defined in subclause 4.5.5, is mapped to the access category of the MO IMS registration related signalling in order to derive an RRC establishment cause, but barring checks will be skipped for this access attempt.
NOTE 3:
If the UE selects a new PLMN, then the selected PLMN is used to check the membership; otherwise the UE uses the RLPMN or a PLMN equivalent to the RPLMN.
NOTE 4:
This includes the 5GMM connection management procedures triggered by the UE-initiated NAS transport procedure for transporting the MO SMS.
NOTE 5:
The UE configured for NAS signalling low priority is not supported in this release of specification. If a UE supporting both S1 mode and N1 mode is configured for NAS signalling low priority in S1 mode as specified in 3GPP TS 24.368 [17] TS 31.102 [22], the UE shall ignore the configuration for NAS signalling low priority when in N1 mode.
NOTE 6:
If the access category applicable for the access attempt is 1, then the UE shall additionally determine a second access category from the range 3 to 7. If more than one access category matches, the access category of the lowest rule number shall be chosen. The UE shall use the second access category only to derive an RRC establishment cause for the access attempt.
NOTE 7:
"EAB override" does not apply; if the UE is not configured to allow overriding EAB (see the "Override_ExtendedAccessBarring" leaf of NAS configuration MO in 3GPP TS 24.368 [17] or 3GPP TS 31.102 [22]), or if NAS has not received an indication from the upper layers to override EAB and the UE does not have a PDU session that was established with EAB override.
NOTE 8:
For the definition of categories a, b and c associated with access category 1, see 3GPP TS 22.261 [3]. The categories associated with access category 1 are distinct from the categories a, b and c associated with EAB (see 3GPP TS 22.011 [1A]).
NOTE 9:
This includes:
a) the UE-initiated NAS transport procedure for transporting a mobile originated location request;
b) the 5GMM connection management procedure triggered by a) above; and
c) NAS signalling connection recovery during an ongoing 5GC-MO-LR procedure.
NOTE 10:
This includes:
a) the UE-initiated NAS transport procedure for transporting a mobile originated signalling transaction towards the PCF;
b) the 5GMM connection management procedure triggered by a) above; and
c) NAS signalling connection recovery during an ongoing UE triggered V2X policy provisioning procedure.

At block 404, the access identity and the access category are provided to the AS layer in the IAB-MT. The NAS layer in the UE may provide the access identity and the access category to the AS layer in the UE. With the changed access identity assigning mechanism or the changed access category assignment mechanism described above, in an instance in which an access attempt of the UE configured for IAB in the current PLMN occurs, Access Identity "X" and/or Access Category "Y" can be assigned to the access attempt. The AS layer receives the access identity for IAB and/or access category for IAB. In another embodiment, the NAS layer may provide the AS layer with Access Category 0.

At Block 405, the AS layer in the UE may determine whether the IAB-MT can make an access attempt to the cell based on at least one of the access identity, access category, and the broadcast information. Based on NR cell (IAB parent) signaling in Master Information Broadcast (MIB) and/or SIB1, as well as its own capabilities (being IAB-MT node or UE), the AS layer ignores the barring check, e.g., if the access identity is "X" and/or the access category is "Y". In this regard, the cell status and cell reservation indicators cellBarred, cellReservedForOperatorUse, cellReservedForOtherUse, and intraFreqReselection are ignored, which enables the IAB-MT to trigger RRC setup initiation procedure (5.3.3.3 in TS38.331). For access attempts associated with access identity "X" and/or access category "Y", if the cell supports IAB (or allows access from IAB nodes), the access attempts are not barred. For access attempts associated with access identity "X" and/or access category "Y", if the cell does not support IAB (or does not allow access from IAB nodes), the access attempts are barred. If the NAS layer assigns Access Category 0 for IAB-MT access attempts, the access attempt is not barred according to the current TS. Thus, the NAS layer should assign Access Category 0 if the NG-RAN allows access from IAB nodes. Thus, the AS layer should indicate to the NAS layer that the NG-RAN supports IAB nodes or that the NG-RAN does not support IAB nodes.

If the NG-RAN does not support IAB nodes, the NAS layer assigns access category and access identities based on the current specifications and the AS layer indicates to the NAS layer that the access attempt is barred when the NAS layer requests a determination as to whether the access attempt is barred or not. With the IAB-specific access identity and access category mechanism described above, in an instance in which an access attempt of the UE configured for IAB in the current PLMN occurs, Access Identity "X" and/or Access Category "Y" is used to determine RRC establishment cause value that will be in use by IAB-MT node.

At Block 406, the RRC establishment cause applicable for IAB access may be set using the access identity and access category. In this regard, when the UE determines that the access attempt to the cell is allowed, the UE may set the RRC establishment cause using the access identity and access category.

In an alternative embodiment, all access attempts from a UE configured for IAB are mapped to the RRC establishment cause for IAB. Table 4.5.6.1 may be modified below as shown in Table E or E-1.

TABLE E

Mapping from access identities and access categories to RRC establishment causes

| Rule # | Access identities | Access categories | RRC establishment cause is set to |
|---|---|---|---|
| Lower than 1 | X | Any category | iab-Access |
| 1 | 1 | Any category | mps-PriorityAccess |
| 2 | 2 | Any category | mcs-PriorityAccess |
| 3 | 11, 15 | Any category | highPriorityAccess |
| 4 | 12, 13, 14, | Any category | highPriorityAccess |
| 5 | 0 | 0 (= MT_acc) | mt-Access |
|  |  | 1 (= delay tolerant) | Not applicable (NOTE 1) |
|  |  | 2 (= emergency) | emergency |
|  |  | 3 (= MO_sig) | mo-Signalling |
|  |  | 4 (= MO MMTel voice) | mo-VoiceCall |
|  |  | 5 (= MO MMTel video) | mo-VideoCall |
|  |  | 6 (= MO SMS and SMSoIP) | mo-SMS |
|  |  | 7 (= MO_data) | mo-Data |
|  |  | 9 (= MO IMS registration related signalling) | mo-Data |

NOTE 1:
A UE using access category 1 for the access barring check will determine a second access category in the range 3 to 7 that is to be used for determination of the RRC establishment cause. See subclause 4.5.2, table 4.5.2.2, NOTE 6.
NOTE 2:
See subclause 4.5.2, table 4.5.2.1 for use of the access identities of 0, 1, 2, and 11-15.

TABLE E-1

Mapping from access identities and access categories to RRC establishment causes

| Rule # | Access identities | Access categories | RRC establishment cause is set to |
|---|---|---|---|
| Lower than 1 | Any access identity | Y ( = IAB) | iab-Access |
| 1 | 1 | Any category | mps-PriorityAccess |
| 2 | 2 | Any category | mcs-PriorityAccess |
| 3 | 11, 15 | Any category | highPriorityAccess |
| 4 | 12,13,14, | Any category | highPriorityAccess |
| 5 | 0 | 0 (= MT_acc) | mt-Access |
|  |  | 1 (= delay tolerant) | Not applicable (NOTE 1) |
|  |  | 2 (= emergency) | emergency |
|  |  | 3 (= MO_sig) | mo-Signalling |
|  |  | 4 (= MO MMTel voice) | mo-VoiceCall |
|  |  | 5 (= MO MMTel video) | mo-VideoCall |
|  |  | 6 (= MO SMS and SMSoIP) | mo-SMS |
|  |  | 7 (= MO_data) | mo-Data |
|  |  | 9 (= MO IMS registration related signalling) | mo-Data |

NOTE 1:
A UE using access category 1 for the access barring check will determine a second access category in the range 3 to 7 that is to be used for determination of the RRC establishment cause. See subclause 4.5.2, table 4.5.2.2, NOTE 6.
NOTE 2:
See subclause 4.5.2, table 4.5.2.1 for use of the access identities of 0, 1, 2, and 11-15.

In another alternative embodiment, all access attempts from a UE configured for IAB are mapped to the RRC establishment cause that is agnostic to IAB-MT. For example, one legacy establishment cause is assigned to IAB-MT access only. In this regard, Table 4.5.6.1 may be modified as shown below in Table F, F-1, or F-2.

TABLE F

Mapping from access identities and access categories to RRC establishment causes

| Rule # | Access identities | Access categories | RRC establishment cause is set to |
|---|---|---|---|
| Lower than 1 | X | Any category | Existing cause value, e.g. mo-Signalling, or mt-Access |
| 1 | 1 | Any category | mps-PriorityAccess |
| 2 | 2 | Any category | mcs-PriorityAccess |
| 3 | 11, 15 | Any category | highPriorityAccess |
| 4 | 12,13,14, | Any category | highPriorityAccess |
| 5 | 0 | 0 (= MT_acc) | mt-Access |
|  |  | 1 (= delay tolerant) | Not applicable (NOTE 1) |
|  |  | 2 (= emergency) | emergency |
|  |  | 3 (= MO_sig) | mo-Signalling |
|  |  | 4 (= MO MMTel voice) | mo-VoiceCall |
|  |  | 5 (= MO MMTel video) | mo-VideoCall |
|  |  | 6 (= MO SMS and SMSoIP) | mo-SMS |
|  |  | 7 (= MO_data) | mo-Data |
|  |  | 9 (= MO IMS registration related signalling) | mo-Data |

NOTE 1:
A UE using access category 1 for the access barring check will determine a second access category in the range 3 to 7 that is to be used for determination of the RRC establishment cause. See subclause 4.5.2, table 4.5.2.2, NOTE 6.?
NOTE 2:
See subclause 4.5.2, table 4.5.2.1 for use of the access identities of 0, 1,2, and 11-15.?

TABLE F-1

Mapping from access identities and access categories to RRC establishment causes

| Rule # | Access identities | Access categories | RRC establishment cause is set to |
|---|---|---|---|
| 1 | 1 | Any category | mps-PriorityAccess |
| 2 | 2 | Any category | mcs-PriorityAccess |
| 3 | 11, 15 | Any category | highPriorityAccess |

TABLE F-1-continued

Mapping from access identities and access categories to RRC establishment causes

| Rule # | Access identities | Access categories | RRC establishment cause is set to |
|---|---|---|---|
| 4 | 12,13,14, | Any category | highPriorityAccess |
| 5 | 0, X | 0 (= MT_acc) | mt-Access |
|  |  | 1 (= delay tolerant) | Not applicable (NOTE 1) |
|  |  | 2 (= emergency) | emergency |
|  |  | 3 (= MO_sig) | mo-Signalling |
|  |  | 4 (= MO MMTel voice) | mo-VoiceCall |
|  |  | 5 (= MO MMTel video) | mo-VideoCall |
|  |  | 6 (= MO SMS and SMSoIP) | mo-SMS |
|  |  | 7 (= MO_data) | mo-Data |
|  |  | 9 (= MO IMS registration related signalling) | mo-Data |

NOTE 1:
A UE using access category 1 for the access barring check will determine a second access category in the range 3 to 7 that is to be used for determination of the RRC establishment cause. See subclause 4.5.2, table 4.5.2.2, NOTE 6.?
NOTE 2:
See subclause 4.5.2, table 4.5.2.1 for use of the access identities of 0, 1,2, and 11-15.?

TABLE F-2

Mapping from access identities and access categories to RRC establishment causes

| Rule # | Access identities | Access categories | RRC establishment cause is set to |
|---|---|---|---|
| Lower than 1 | Any access identity |  | iab-Access |
| 1 | 1 | Any category | mps-PriorityAccess |
| 2 | 2 | Any category | mcs-PriorityAccess |
| 3 | 11, 15 | Any category | highPriorityAccess |
| 4 | 12,13,14, | Any category | highPriorityAccess |
| 5 | 0 | Y ( = IAB) | Not applicable (NOTE 1) |
|  |  | 0 (= MT_acc) | mt-Access |
|  |  | 1 (= delay tolerant) | Not applicable (NOTE 1) |
|  |  | 2 (= emergency) | emergency |
|  |  | 3 (= MO_sig) | mo-Signalling |
|  |  | 4 (= MO MMTel voice) | mo-VoiceCall |
|  |  | 5 (= MO MMTel video) | mo-VideoCall |
|  |  | 6 (= MO SMS and SMSoIP) | mo-SMS |
|  |  | 7 (= MO_data) | mo-Data |
|  |  | 9 (= MO IMS registration related signalling) | mo-Data |

NOTE 1:
A UE using access category 1 for the access barring check will determine a second access category in the range 3 to 7 that is to be used for determination of the RRC establishment cause. See subclause 4.5.2, table 4.5.2.2, NOTE 6.?
NOTE 2:
See subclause 4.5.2, table 4.5.2.1 for use of the access identities of 0, 1,2, and 11-15.?

Figure 5:
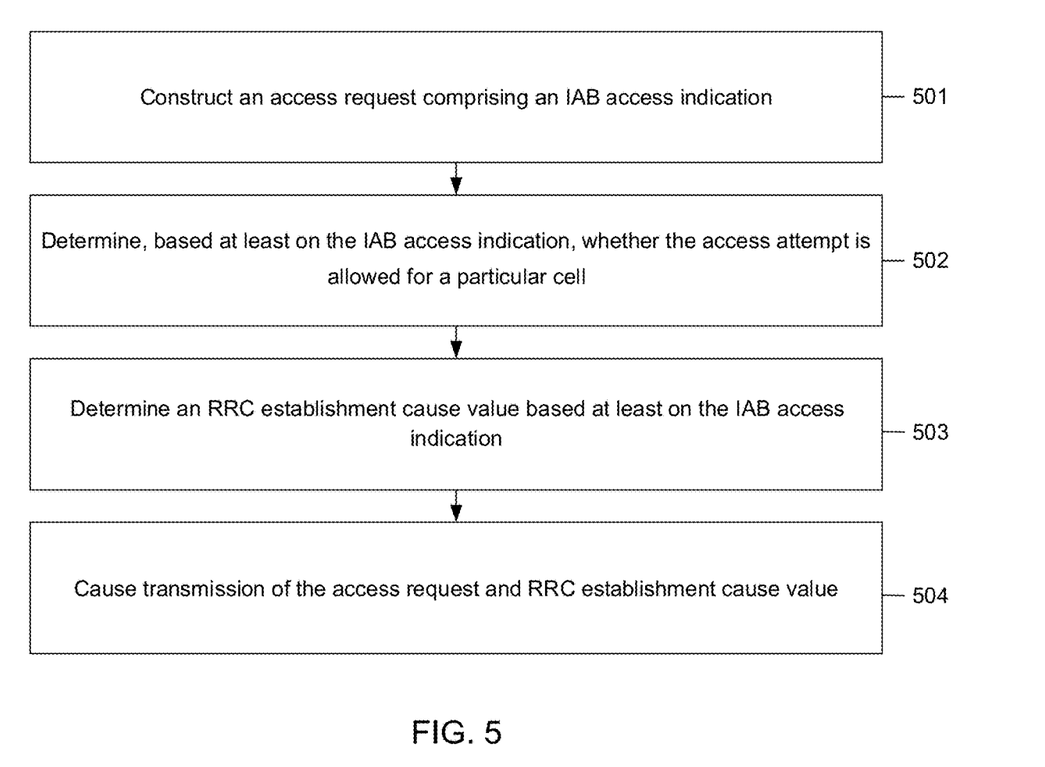
FIG. 5 is a flow diagram illustrating operations performed in accordance with an example embodiment.

FIG. 5 provides further detailed operations of apparatus 300 as described above. At operation 501, the apparatus 300 includes means, such as processor 32, memory 34, and/or the like, for constructing an access request comprising an IAB access indication. As described above, the IAB access indication may be an access category or an access identity. At operation 502, the apparatus 300 includes means, such as processor 32, memory 34, and/or the like, for determining, based at least on the IAB access indication, whether an access attempt is allowed for a particular cell. At operation 503, the apparatus 300 includes means, such as processor 32, memory 34, and/or the like, for determining an RRC establishment cause value based at least on the IAB access indication. the apparatus 300 includes means, such as processor 32, memory 34, and/or the like, for causing transmission of the access request and RRC establishment cause value.

In an embodiment, the NAS layer assigns, to at least one access request made by an IAB-MT valid in the current PLMN, an access identity (e.g., access identity "X") associated with IAB-MT (e.g., for a UE configured for IAB). In this regard, the RRC layer does not bar an access attempt with access identity "X" in an instance in which the NG-RAN broadcasts an IAB node is allowed, regardless of the current barring and UAC setting broadcast by the particular cell. The RRC establishment cause for the access attempt associated with access identity "X" is mapped to a new RRC establishment cause or the existing RRC establishment cause, e.g. mo-Signalling, or mt-Access, as described above.

In this regard, the NG-RAN does not bar a request with the new RRC establishment cause, nor does it bar a request with the existing RRC establishment cause. If the existing RRC establishment cause is not mt-Access, and the UE does not have a 5G-S-TMSI, then it would not draw a random number, but a predefined number (e.g., all zeros (0)). Based on this, the network may allow access. If the UE were to not send an IAB indication in RRCSetupComplete, the connection may be released, due to the possibility of a normal UE drawing all zeros (0) as a predefined number. If the existing RRC establishment cause is not mt-Access and the UE has 5G-S-TMSI, then it is included in the RRCSetupRequest. Donor CU may be configured via OAM with a list of 5G-S-TMSIs which belong to IAB-MTs and may allow access.

Similarly, in another embodiment, the NAS layer may assign, to at least one access request made by an IAB-MT valid in the current PLMN, an access category (e.g., "Y"), which is for an IAB-MT as described above, and the RRC layer does not bar an access attempt with access category "Y" if the associated NG-RAN broadcasts that an IAB node is allowed. The RRC establishment cause for the access attempt associated with Access Category Y is mapped to a new RRC establishment cause (see Alt-A in f)) or the existing RRC establishment cause, e.g. mo-Signalling, mt-Access (see Alt-B in f)).

In another embodiment, the NAS layer may assign, to at least one access request made by an IAB-MT valid in the current PLMN, an access category associated with an access attempt initiated by an IAB-MT function in a cell indicating IAB support. For example, access category "0" (as shown in Table C above) may be assigned if the RRC layer has indicated that the NG-RAN allows access of an IAB node. In order to achieve this, the RRC layer may provide an indication that the NG-RAN allowed access of an IAB node if the NG-RAN broadcasts that access from an IAB node is allowed/supported in the PLMN. In some embodiments, if the UE is configured for IAB in the current PLMN and the NG-RAN does not allow access from an IAB node for the PLMN, the NAS layer performs as-is. The RRC layer shall indicate to the NAS layer that the access attempt is barred whenever access barring check is requested. The NAS layer may assume all access attempts are barred without requesting the AS layer to perform the barring check.

In another embodiment, there may be no change in the NAS layer. In this regard, the RRC layer may not bar any access attempts from an IAB-MT valid in the current PLMN if the NG-RAN broadcasts an indication that an IAB node is allowed for the PLMN. The RRC layer may thus ignore access identities and/or access categories provided from the NAS layer. The RRC layer does not conform the mapping rule in subclause 4.5.6 in TS 24.501. In one alternative, the RRC layer may map all access attempts from an IAB-MT valid in the current PLMN to the RRC establishment cause "mt-Access" if the NG-RAN allows access from an IAB node for the PLMN. When the RRC layer of IAB-MT is asked to perform a barring check, the RRC layer answers that the access attempt is allowed if the NG-RAN allows access from an IAB and that the access attempt is barred if the NG-RAN does not allow access from an IAB.

In another embodiment, the RRC layer may assign an "AS-originated" access category for IAB-MT access (as shown in Table B-1 above) and perform its own mapping rule to RRC establishment causes when initiating RRC establishment, e.g., a request with the new RRC establishment cause or a request with the existing RRC establishment cause. If the UE is configured for IAB in the current PLMN and the NG-RAN does not allow access from an IAB node, the RRC layer may indicate to the NAS layer that the access attempt is barred whenever an access attempt is being made, e.g., the NAS layer request to the AS layer on whether the access attempt is barred.

In another embodiment, for IAB-MT, if the AS layer indicates that the NG-RAN allows access from IAB nodes (e.g., the cell broadcasts IAB support), the NAS layer skips the barring check request and provides neither an access identity nor access category to the AS layer. In this case, the RRC establishment cause may be set to "mt-Access." Otherwise (e.g., for IAB-MT, if the AS layer does not indicate that the NG-RAN allows access from IAB nodes), the NAS layer treats all access attempts are barred without asking the AS layer to perform the barring check.

In the above alternative embodiments, any combination may be possible. As one example, for IAB-MT, if the AS layer indicates that the NG-RAN allows access from IAB nodes (e.g., the cell broadcasts IAB support), the NAS layer skips the barring check request and does not provide an access identity or access category to the AS layer. In this case, the RRC establishment cause is set to mt-Access, and if the UE is configured for IAB in the current PLMN and the NG-RAN does not allow access from an IAB node for the PLMN, the NAS layer performs as-is. The RRC layer shall indicate to the NAS layer that the access attempt is barred whenever an access barring check is requested.

FIGS. 4 and 5 illustrate flowcharts depicting methods according to a certain example embodiments. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 34 of an apparatus employing an embodiment of the present disclosure and executed by a processor 32. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising: at least one processor; and at least one memory including computer program code, the at least one memory and the computer program code configured to, with the at least one processor, cause the apparatus to:
   determine that an access attempt associated with Integrated Access and Backhaul (IAB) access is to be performed;
   by a non-access spectrum (NAS) layer, based on the determination, construct an access request comprising an IAB access indication;
   determine, by an access spectrum (AS) layer, based at least on the IAB access indication, whether the access attempt is allowed for a particular cell;
   in an instance in which it is determined that the access attempt is allowed for the particular cell, by the NAS layer, set an establishment cause using an access category and an access identity;
   skip, by the NAS layer, a barring check request for the access request;
   provide, from the NAS layer to the AS layer, neither the access category nor the access identity; and
   cause transmission of the access request and the establishment cause.

2. The apparatus of claim 1, wherein the IAB access indication comprises the access category and the access indication.

3. The apparatus of claim 1, wherein the establishment cause is a radio resource control (RRC) establishment cause.

4. The apparatus of claim 1, wherein the access category characterizes a type of the access attempt.

5. The apparatus of claim 1, wherein the access identity characterizes user equipment (UE) associated with the access attempt.

6. The apparatus of claim 1, wherein the at least one memory and the computer program code are further configured to, with the at least one processor, cause the apparatus to:
in an instance in which it is determined that the access attempt is not allowed for the particular cell, bar the access attempt.

7. The apparatus of claim 1, wherein the access attempt is associated with one of a Short Message Service (SMS) message or a voice call.

8. A method comprising:
determining that an access attempt associated with Integrated Access and Backhaul (IAB) access is to be performed;
by a non-access spectrum (NAS) layer, based on the determination, constructing an access request comprising an IAB access indication;
determining, by an access spectrum (AS) layer, based at least on the IAB access indication, whether the access attempt is allowed for a particular cell;
in an instance in which it is determined that the access attempt is allowed for the particular cell, by the NAS layer, setting an establishment cause using an access category and an access identity;
skipping, by the NAS layer, a barring check request for the access request;
providing, from the NAS layer to the AS layer, neither the access category nor the access identity; and
causing transmission of the access request and the establishment cause.

9. The method of claim 8, wherein the IAB access indication comprises the access category and the access indication.

10. The method of claim 8, wherein the establishment cause is a radio resource control (RRC) establishment cause.

11. The method of claim 8, wherein the access category characterizes a type of the access attempt.

12. The method of claim 8, wherein the access identity characterizes user equipment (UE) associated with the access attempt.

13. The method of claim 8, further comprising:
in an instance in which it is determined that the access attempt is not allowed for the particular cell, barring the access attempt.

14. The method of claim 8, wherein the access attempt is associated with one of a Short Message Service (SMS) message or a voice call.

15. A computer program product comprising a non-transitory computer readable storage medium having program code portions stored thereon, the program code portions configured, upon execution, to:
determine that an access attempt associated with Integrated Access and Backhaul (IAB) access is to be performed;
by a non-access spectrum (NAS) layer, based on the determination, construct an access request comprising an IAB access indication;
determine, by an access spectrum (AS) layer, based at least on the IAB access indication, whether the access attempt is allowed for a particular cell;
in an instance in which it is determined that the access attempt is allowed for the particular cell, by the NAS layer, set an establishment cause using an access category and an access identity;
skip, by the NAS layer, a barring check request for the access request;
provide, from the NAS layer to the AS layer, neither the access category nor the access identity; and
cause transmission of the access request and the establishment cause.

16. The computer program product of claim 15, wherein the IAB access indication comprises the access category and the access indication.

17. The computer program product of claim 15, wherein the establishment cause is a radio resource control (RRC) establishment cause.

18. The computer program product of claim 15, wherein the access category characterizes a type of the access attempt.

19. The computer program product of claim 15, wherein the access identity characterizes user equipment (UE) associated with the access attempt.

20. The computer program product of claim 15, wherein the program code portions are further configured, upon execution, to:
in an instance in which it is determined that the access attempt is not allowed for the particular cell, bar the access attempt.

* * * * *

UNITED STATES PATENT AND TRADEMARK OFFICE
CERTIFICATE OF CORRECTION

| | | |
|---|---|---|
| PATENT NO. | : 11,570,691 B2 | Page 1 of 1 |
| APPLICATION NO. | : 17/314595 | |
| DATED | : January 31, 2023 | |
| INVENTOR(S) | : Won et al. | |

It is certified that error appears in the above-identified patent and that said Letters Patent is hereby corrected as shown below:

In the Claims

Column 24,
Line 52, "non-access spectrum (NAS) layer" should read --non-access stratum (NAS) layer--;
Line 55, "access spectrum (AS) layer" should read --access stratum (AS) layer--.

Column 25,
Line 25, "non-access spectrum (NAS) layer" should read --non-access stratum (NAS) layer--;
Line 28, "access spectrum (AS) layer" should read --access stratum (AS) layer--.

Column 26,
Line 15, "non-access spectrum (NAS) layer" should read --non-access stratum (NAS) layer--;
Line 18, "access spectrum (AS) layer" should read --access stratum (AS) layer--.

Signed and Sealed this
Eighteenth Day of March, 2025

Coke Morgan Stewart
*Acting Director of the United States Patent and Trademark Office*